(12) United States Patent
Singer

(10) Patent No.: US 10,100,998 B2
(45) Date of Patent: Oct. 16, 2018

(54) ELECTRICALLY SHIELDED LIGHTING APPARATUS

(71) Applicant: The Boeing Company, Huntington Beach, CA (US)

(72) Inventor: Scott B. Singer, Sherman Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 566 days.

(21) Appl. No.: 14/721,194

(22) Filed: May 26, 2015

(65) Prior Publication Data
US 2016/0348867 A1    Dec. 1, 2016

(51) Int. Cl.
| | |
|---|---|
| *F21V 1/00* | (2006.01) |
| *F21S 45/10* | (2018.01) |
| *G02B 1/11* | (2015.01) |
| *F21S 41/20* | (2018.01) |
| *F21S 43/20* | (2018.01) |
| *F21S 41/143* | (2018.01) |
| *F21S 43/14* | (2018.01) |
| *B64D 47/02* | (2006.01) |

(52) U.S. Cl.
CPC .............. *F21S 45/10* (2018.01); *B64D 47/02* (2013.01); *F21S 41/143* (2018.01); *F21S 41/28* (2018.01); *F21S 41/285* (2018.01); *F21S 43/14* (2018.01); *F21S 43/26* (2018.01); *G02B 1/11* (2013.01); *B64D 2203/00* (2013.01)

(58) Field of Classification Search
CPC .... F21S 48/31; F21S 48/1154; F21S 48/1225; F21S 48/1233; F21S 48/215; F21S 48/2212; B64D 47/02; G02B 1/11
USPC .......................................................... 362/509
See application file for complete search history.

(56) References Cited

U.S. PATENT DOCUMENTS

| | | | | |
|---|---|---|---|---|
| 3,976,870 A | * | 8/1976 | Schmidt ............. | G03B 15/0442 362/11 |
| 4,101,260 A | * | 7/1978 | Wanninkhof .......... | G03B 15/04 431/359 |
| 6,424,442 B1 | * | 7/2002 | Gfeller ............... | H04B 10/1143 362/242 |
| 6,975,453 B1 | * | 12/2005 | Lippens .............. | C03C 17/3417 359/469 |

(Continued)

OTHER PUBLICATIONS

Bohren et al., "Absorption and Scattering of Light by Small Particles," New York: Wiley, 1983, pp. 194-199 and 208-209.

(Continued)

*Primary Examiner* — Bryon T Gyllstrom
(74) *Attorney, Agent, or Firm* — MH2 Technology Law Group LLP

(57) ABSTRACT

In one aspect, apparatus are described herein. In some implementations, an apparatus comprises a housing disposed in or on an exterior surface of a vehicle, a light emitting diode disposed in the housing, and an electrically conductive layer disposed over the light emitting diode and in an optical path of the light emitting diode. Further, the electrically conductive layer and the housing together form a Faraday cage surrounding the light emitting diode. Additionally, in some cases, the electrically conductive layer has an optical transparency of at least 70% in the visible region of the electromagnetic spectrum.

18 Claims, 4 Drawing Sheets

(56) References Cited

U.S. PATENT DOCUMENTS

| | | | | |
|---|---|---|---|---|
| 7,364,319 B2* | 4/2008 | Canella | ............... | F21L 4/00 |
| | | | | 362/158 |
| 7,919,019 B2* | 4/2011 | Park | ............... | F21K 2/06 |
| | | | | 252/700 |
| 8,541,940 B2* | 9/2013 | Moran-Mirabal | ..... | B82Y 20/00 |
| | | | | 313/502 |
| 8,770,796 B2* | 7/2014 | Gordin | ............... | H05B 41/40 |
| | | | | 362/263 |
| 8,911,836 B2 | 12/2014 | Ladd | | |
| 2007/0247850 A1* | 10/2007 | Hawkins | ............... | F21V 25/00 |
| | | | | 362/267 |
| 2011/0038172 A1* | 2/2011 | Vollmer | ............... | F21V 3/04 |
| | | | | 362/543 |
| 2015/0323159 A1* | 11/2015 | Dinant | ............... | F21K 9/20 |
| | | | | 362/516 |
| 2016/0369970 A1* | 12/2016 | Faoucher | ............... | F21S 48/30 |

OTHER PUBLICATIONS

Singer, "Comprehensive Pyrometry of Incandescent Multiwalled Carbon Nanotubes and Graphene in the Visible and Near Infrared," UCLA Ph.D. Thesis, 2012, 170 pages.

Tully, "New Polymer Could Revolutionize Consumer Electroncs," http://oilprice.com/Latest-Energy-News/World-News/New-Polymer-Could-Revolutionize-Consumer-Electronics.html, OilPrice.com, 2014, 2 pages.

"Lightning Strike Protection," http://www.appliednanostructuredsolutions.com/lightning-strike-protection, Applied NanoStructured Solutions, LLC, 2013, 1 page.

"LORD® UltraConductive Film and Coatings for Lightning Strike Protection," http://www.lord.com/emea/Documents/Product%20Brochures/PB6071_UltraConductiveFilmandCoatings.pdf, LORD Corporation, 2012, 4 pages.

"Protecting LED Lighting Systems," http://alltecglobal.com/news/view/protecting-led-lighting-systems, ALLTEC Global, 2014, 2 pages.

* cited by examiner

ELECTRICALLY SHIELDED LIGHTING APPARATUS

FIELD

The present disclosure relates to lighting apparatus and, in particular, to electrically shielded lighting apparatus for exterior lighting applications.

BACKGROUND

Vehicles frequently utilize exterior lighting assemblies and/or apparatus in order to increase visibility for an interior operator and/or to permit an external observer to determine a location of the vehicle during operation. Such increased visibility can provide numerous safety benefits for land, sea, and air vehicles. However, disposing a light source on or in an external surface of a vehicle can subject the light source to a wide variety of hazards or risks which might compromise or otherwise damage the light source. Such risks may include damage from an external object or event, such as a lightning strike or impact by a foreign object. Unfortunately, some light sources, such as light emitting diodes (LEDs), are particularly vulnerable to damage from such external factors. The use of such light sources for some exterior lighting applications, such as external search light applications, has thus been limited, despite other advantages offered by these light sources. Therefore, there is a need for improved lighting apparatus and methods of protecting light sources such as LEDs from lightning strikes or other electrical events, including exposure to strong electromagnetic fields and/or plasma discharges having a high degree of ionization.

SUMMARY

In one aspect, lighting apparatus are described herein which, in some implementations, can provide one or more advantages compared to some other lighting apparatus. For instance, in some cases, an apparatus described herein can provide improved resistance of a light source to damage caused by electrical shock or other electrical events or conditions. More particularly, in some instances, an apparatus described herein can dissipate or transport electric current and/or electrical fields away from a light source. In addition, in some implementations, an apparatus described herein can provide electrical protection to a light source while also minimally absorbing light emitted by the light source. Thus, an apparatus described herein, in some cases, can be used for lighting applications requiring not only bright illumination but also exposure of the apparatus to harsh environmental conditions, such as may be encountered by external search lights of a vehicle. Moreover, in some instances, an apparatus described herein can provide one or more of the foregoing advantages while also operating at reduced power, reduced cost, and/or increased energy efficiency. For example, in some cases, a lighting apparatus described herein can enable a shorter "turn on" time of the light source, a longer useful service lifetime of the light source, and/or a reduced risk of fire or ignition of explosive atmospheres by the apparatus.

In some implementations, an apparatus described herein comprises a housing, a light source disposed in the housing, and an electrically conductive layer or coating disposed over the light source and in an optical path of the light source. Further, the electrically conductive layer and the housing can together form a Faraday cage surrounding the light source. Moreover, in some implementations, the housing is disposed in or on an exterior surface of a vehicle, such as a boat or aircraft. In some cases, the light source is a light emitting diode (LED). Further, the electrically conductive layer of the apparatus can have an optical transparency of at least 70% in the visible region of the electromagnetic spectrum. Additionally, in some implementations, the electrically conductive layer can have a sheet resistivity of less than or equal to about 100 Ohms/square. In some cases, the electrically conductive layer comprises or is formed from a transparent conductive oxide (TCO). In other implementations, the electrically conductive layer comprises or is formed from a nanomesh including or defined by a plurality of electrically conductive nanowires. Moreover, in some instances, an apparatus described herein further comprises a lens and/or an anti-reflective layer or coating. The lens and/or anti-reflective layer can be disposed over the light source and in an optical path of the light source. Additionally, in some implementations, a single layer of an apparatus described herein can operate as both an anti-reflective layer and an electrically conductive layer.

In another aspect, protective attachments or apparatus for light sources are described herein. In some instances, such a protective attachment or apparatus can be a lens assembly or transparent cover for a light source. For example, in some instances, a protective attachment or apparatus described herein comprises an optically transparent substrate or lens and an electrically conductive layer disposed on the substrate or lens, wherein the electrically conductive layer has a structure such as described herein for a lighting apparatus and wherein the electrically conductive layer is operable to form a Faraday cage surrounding the light source when the substrate or lens and the light source are disposed in an electrically conductive housing.

In still another aspect, methods of protecting a light source from electrical damage are described herein. More particularly, a method described herein, in some cases, can protect a light source, such as an LED, from damage caused by external electric fields, electric current, electrical shocks, and/or static or non-static electrical discharge. In some implementations, such a method comprises disposing a light source in a housing and disposing an electrically conductive layer over the light source and in an optical path of the light source, wherein the electrically conductive layer has an optical transparency of at least 70% in the visible region of the electromagnetic spectrum and wherein the electrically conductive layer and the housing together form a Faraday cage surrounding the light source. In other instances, such a method comprises disposing a protective attachment or apparatus described herein over a light source, the protective attachment or apparatus comprising an attachment or apparatus described hereinabove.

These and other implementations are described in more detail in the detailed description which follows.

DETAILED DESCRIPTION

Figure 1A:
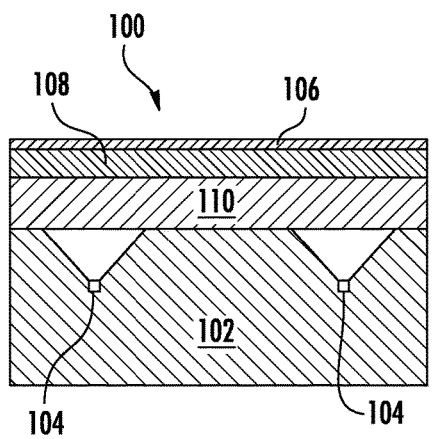
FIGS. 1A-1D each illustrates cross-sectional schematic views of apparatus according to some implementations described herein.

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points of 5 and 10.

In one aspect, lighting apparatus are described herein. In some implementations, a lighting apparatus described herein comprises a housing, a light source disposed in the housing, and an electrically conductive layer or coating disposed over the light source and in an optical path of the light source. The electrically conductive layer and the housing together form a Faraday cage surrounding the light source. Moreover, the electrically conductive layer of the apparatus has an optical transparency of at least 70% in the visible region of the electromagnetic spectrum. Additionally, in some implementations, the housing is disposed in or on an exterior surface of a vehicle, such as a boat or aircraft. Moreover, in some instances, an apparatus described herein further comprises a lens and/or an anti-reflective layer or coating, wherein the lens and/or anti-reflective layer is disposed over the light source and in an optical path of the light source.

Turning now to specific components of lighting apparatus described herein, lighting apparatus described herein comprise a housing. A housing can have any shape, structure, or form factor not inconsistent with the objectives of the present disclosure. For example, in some implementations, a housing can be an external component mounted, attached, or otherwise fastened to an exterior surface of a structure. In certain other implementations, a housing can be recessed within, disposed within, or otherwise located in an exterior surface of a structure. Additionally, housings usable in apparatus described herein can comprise or be formed from any material not inconsistent with the objectives of the present disclosure. For example, in some cases, a housing can comprise or be formed from an electrically conductive material such as a metal, metal alloy, metal mixture, metal oxide, or other conductive material. In other instances, a housing may not be formed entirely of an electrically conductive material. Instead, in some cases, a housing may be formed from both electrically conductive and electrically insulating material. Further, in some such instances, a housing can comprise one or more electrically conductive structures, components, or features disposed on or within the housing. Such structures, in some instances, can permit the housing to conduct electricity around a light source which may be disposed within the housing. Moreover, a housing can be disposed in or on an exterior surface of any structure. For example, in some implementations, a housing is disposed in or on an exterior surface of a vehicle. Any vehicle may be used. In some implementations, the vehicle is a land transit vehicle such as a car, truck, or other automobile. In certain other implementations, the vehicle is a seafaring vehicle such as a boat. Moreover, in some cases, the vehicle is an aircraft such as an airplane, helicopter, or gyrocopter.

Apparatus described herein also comprise or include a light source disposed within the housing. Any light source not inconsistent with the objectives of the present disclosure can be used. For example, in some implementations, the light source can be a light bulb such as a filament bulb, a fluorescent bulb, and/or a halogen bulb. In certain other cases, the light source comprises or includes a light emitting diode (LED). Moreover, in some implementations, a light source can comprise or include a laser diode. For reference purposes herein, it should be noted that an "LED" is not a laser diode. A light source disposed within a housing as described herein is generally operable to emit light along an optical path. An "optical path," for reference purposes herein, indicates a path or direction of light emitted by the light source as the light moves away from the light source. An optical path may be generally linear (such as may be the case for unreflected or unrefracted light) or generally non-linear (such as may be the case for emitted light that is subsequently reflected or refracted). In addition, a light source of an apparatus described herein, such as a light bulb or light emitting diode, can emit light having any wavelength profile not inconsistent with the objectives of the present disclosure. In some cases, for instance, the light source emits white light. In other implementations, a light source emits blue light, green light, yellow light, orange light, or red light, where the differing colors may be determined according to a standard color assignment scheme, such as the CIE 1931 chromaticity diagram or color space. As described further herein, apparatus of the present disclosure may be particularly useful for light sources comprising a white-light emitting LED. Moreover, in some implementations, the light source of an apparatus described herein is a high-power light source or a light source having a high luminous emittance, such as may be desired for an exterior search light.

Apparatus described herein further comprise an electrically conductive layer disposed over the light source and in an optical path of the light source. Moreover, the electrically conductive layer and the housing can together form or define a Faraday cage surrounding the light source. A "Faraday cage," for reference purposes herein, is an enclosure formed by conductive material or by a mesh of such material operable to "block" external static and non-static electric fields by channeling electric current along and around, but not through, the cage or enclosure, thereby shielding the interior of the cage or enclosure from such external static and non-static electric fields. Not intending to be bound by theory, it is believed that the electrically conductive layer and the housing of an apparatus described herein can cause an electric charge or field, such as an electrostatic discharge, to be conducted, distributed, or dissipated within the cage's conducting material such that the charge within the cage's conducting material cancels the field's effect within the cage's interior space. Thus, an electrically conductive layer and housing configured in a manner described herein can shield a light source (or a plurality of light sources) disposed within the housing from an external static or non-static electric shock or charge, thereby preventing or mitigating damage to the light source. For example, in some cases, a Faraday cage formed or defined by the housing and electrically conductive layer can be operable to block or shield the light source from a lightning strike, plasma discharge having a high degree of ionization, electrostatic discharge, exposure to a strong electromagnetic field, and/or shock emitted by an operator or piece of equipment contacting the apparatus or contacting a structure to which the apparatus is attached.

Moreover, it is to be understood that a Faraday cage described herein can provide electrical shielding or other electrical protection to a light source in addition to further protection that may be provided to the light source by other components or features of the apparatus. For example, the light source of an apparatus described herein, in some implementations, may further comprise internal surge protection or prevention components, such as may be included within a circuit operating the light source. In general, such internal or in-line surge protection means are intended to prevent or mitigate damage to a light source from power surges within an electrical circuit powering the light source. In contrast, a Faraday cage described herein may be operable to mitigate or eliminate electrical fields, shocks, or discharges—static or non-static—which might otherwise contact or damage the light source from an external location. Therefore, in some implementations, an apparatus described herein can comprise an internal surge protector integral with or in electrical communication with the light source, in addition to comprising an electrically conductive layer and housing that together form a Faraday cage.

It is to be understood that the electrical conductivity of an electrically conductive layer of an apparatus described herein can be selected based on a desired application or structure of a lighting apparatus described herein. For example, in some implementations, an electrically conductive layer comprises or is formed from a material such that a sheet resistivity of the electrically conductive layer permits sufficient conductivity for a desired Faraday cage operability. In general, an electrically conductive layer can have any sheet resistivity not inconsistent with the objectives of the present disclosure. For example, in some implementations, the electrically conductive layer has a sheet resistivity less than or equal to about 200 Ohms/square, less than or equal to about 175 Ohms/square, less than or equal to about 150 Ohms/square, less than or equal to about 125 Ohms/square, or less than or equal to about 100 Ohms/square. In some cases, the electrically conductive layer has a sheet resistivity of between about 50 Ohms/square and about 200 Ohms/square, between about 75 and about 175 Ohms/square, between about 50 Ohms/square and about 150 Ohms/square, or between about 75 Ohms/square and about 125 Ohms/square. It is to be understood that the sheet resistivity of an electrically conductive layer can be measured in any manner not inconsistent with the objectives of the present disclosure. In some cases, for instance, sheet resistivity can be measured using a four-point probe or four-probe array, including in accordance with the Van der Pauw method. In such an implementation, a constant current can be applied to two of the four probes while the potential on the other two probes is measured with a high impedance voltmeter. Additionally, a geometry factor is used to take into account the arrangement of the four-probe array, which may be square or in-line. Sheet resistivity may also be measured by applying high conductivity bus bars, in ohmic contact, to opposite edges of a rectangular or square electrically conductive layer. In this approach, measured resistance across the square area corresponds to the sheet resistivity in Ohms/square. If a rectangular area is used, the sheet resistivity is obtained after applying a geometric factor, as understood by one of ordinary skill in the art.

An electrically conductive layer of an apparatus described herein can also have a high degree of optically transparency. In particular, the electrically conductive layer can be transparent to light having a wavelength in a desired portion of the electromagnetic spectrum, such as the visible region, the ultraviolet (UV) region, or the infrared (IR) region of the electromagnetic spectrum. Moreover, in some instances, the electrically conductive layer has a high optical transparency in a region of the electromagnetic spectrum corresponding to the emission profile of the light source of the apparatus, thereby permitting a high percentage of light emitted by the light source to exit the apparatus for external illumination purposes. For example, in some implementations, the electrically conductive layer is optically transparent between about 350 nm and about 800 nm (such as may be desired for a white-light emitting light source), between 300 nm and about 450 nm, between about 300 nm and about 500 nm, between about 400 nm and about 800 nm, between about 400 nm and about 700 nm, between about 500 nm and about 800 nm, between about 500 nm and about 700 nm, or between about 600 nm and about 800 nm. It is to be understood that "optical transparency," for reference purposes herein, is average optical transparency (or average percent transmittance of incident light) over a desired range of wavelengths of light, including a range of wavelengths described hereinabove. For example, in some cases, the electrically conductive layer has an optical transparency of at least about 70%, at least about 80%, at least about 85%, at least about 90%, or at least about 93% in the visible region of the electromagnetic spectrum (between 350 nm and 800 nm), in the UV region of the spectrum (between 100 nm and 350 nm), or in the IR region of the spectrum (between 800 nm and 15 μm). Additionally, in some implementations, the electrically conductive layer has an optical transparency between about 70% and about 100%, between about 70% and about 99%, between about 70% and about 98%, between about 70% and about 95%, between about 80% and about 95%, between about 85% and about 95%, or between about 90% and about 95% in the visible region, UV region, or IR region of the electromagnetic spectrum or in a subset of the visible, UV, or IR region of the electromagnetic spectrum, such as between 350 nm and 450 nm, between 100 nm and 200 nm, between 800 nm and 1400 nm, between 850 nm and 1200 nm, between 1.4 μm and 3 μm, between 3 μm and 8 μm, or between 8 μm and 15 μm.

Further, an electrically conductive layer of an apparatus described herein can comprise or be formed from any material not inconsistent with the objectives of the present disclosure. For example, in some implementations, an electrically conductive layer can comprise or be formed from a transparent conductive oxide (TCO). Any TCO not inconsistent with the objectives of the present disclosure can be used. For instance, in some cases, an electrically conductive layer can comprise or be formed from one or more of indium tin oxide (ITO), aluminum-doped zinc oxide (AZO), indium-doped cadmium oxide, strontium oxide, and fluorine-doped tin oxide (FOT). An electrically conductive layer can also comprise or be formed from a so-called multi-metal or multiple oxide. For example, in some instances, an electrically conductive layer comprises or is formed from $SrCu_2O_2$. In some cases, use of one or more of the foregoing materials can provide an apparatus having a lower production cost and/or a desired combination of electric shielding and optical transparency.

Figure 4:
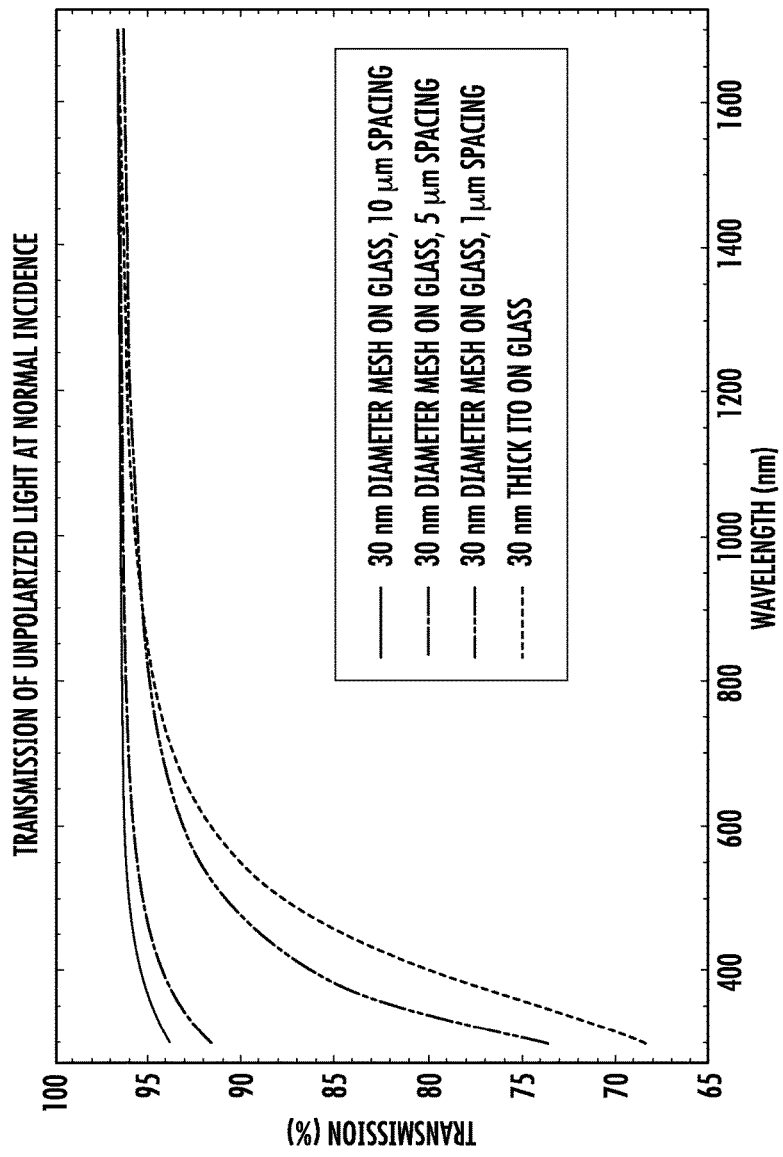
FIG. 4 illustrates a plot of light transmission over a range of wavelengths of light for various electrically conductive layers according to some implementations described herein.

An electrically conductive layer comprising or formed from a TCO can have any structure or dimensions not inconsistent with the objectives of the present disclosure. For example, in some implementations, an electrically conductive layer formed from a TCO can have an average thickness of about 300 nm or less, about 200 nm or less, about 100 nm or less, or about 50 nm or less. In some cases, an electrically conductive layer has an average thickness between about 10 nm and about 300 nm, between about 10 nm and about 250 nm, between about 10 nm and about 200 nm, between about 10 nm and about 150 nm, between about 10 nm and about 100 nm, between about 10 nm and about 50 nm, between about 20 nm and about 80 nm, between about 20 nm and about 60 nm, or between about 20 nm and about 40 nm. It is to be understood that the thickness of such an electrically conductive layer can be selected to provide a desired combination of, or balance between, electrical conductivity and optical transparency. FIG. 4 illustrates a model of the theoretical optical transparency of an electrically conductive layer over a range of wavelengths including the visible region of the electromagnetic spectrum, wherein the layer is a TCO layer having a thickness of about 30 nm.

Figure 3A:
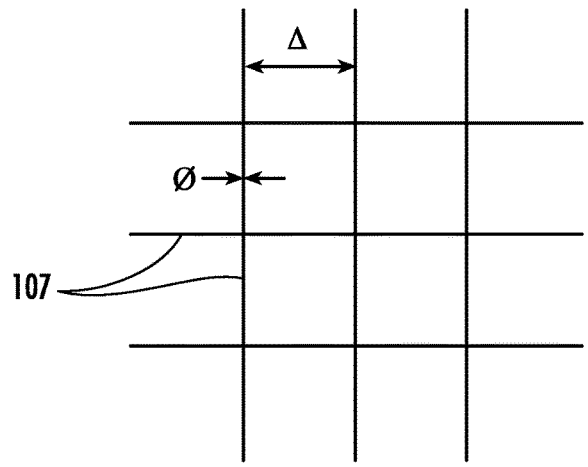
FIGS. 3A-3C each illustrates schematic representations of nanomeshes which may be used in apparatus according to some implementations described herein.
Figure 3B:
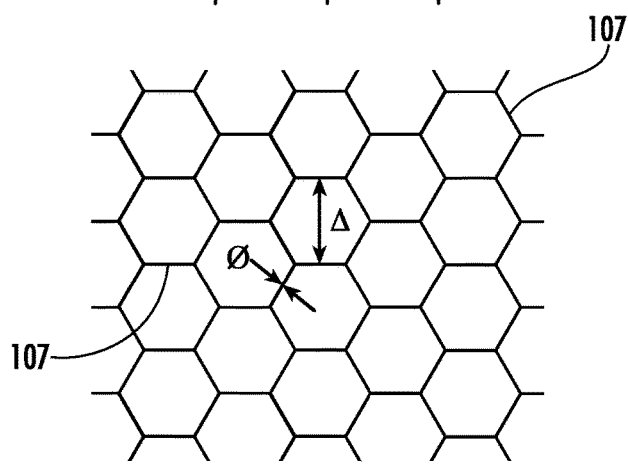
Figure 3C:
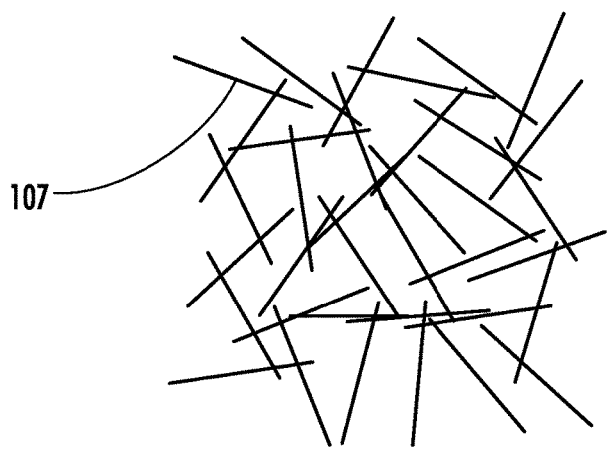

In other implementations, an electrically conductive layer of an apparatus described herein comprises or is formed from a nanomesh. A "nanomesh," in some cases, can be a mesh formed from nanoscale components, such as components having an average size between about 1 nm and about 300 nm, between about 1 nm and about 200 nm, or between about 1 nm and about 100 nm. Moreover, such a nanomesh can comprise, be formed from, or defined by a plurality of electrically conductive nanowires. The electrically conductive nanowires can comprise or be formed from any material not inconsistent with the objectives of the present disclosure. For example, in some cases, the nanowires comprise or are formed from metal, transparent conductive oxide, carbon nanotubes, semiconducting material, and/or a combination of the foregoing. Moreover, the selection of a specific material, in some instances, can be made to provide a nanomesh having a desired production cost, electrical conductivity, and/or optical transparency. Additionally, the nanowires of the nanomesh can be arranged in any pattern or structure not inconsistent with the objectives of the present disclosure. For instance, in some implementations, the nanowires define a grid of nanowires, such as a grid of orthogonal nanowires. In other cases, the nanowires of the mesh are randomly oriented in an xy-plane of the mesh. As described further hereinbelow, the selection of a specific arrangement of nanowires can be made to provide a desired optical transparency profile (as may be the case for grids of nanowires) and/or to provide reduced manufacturing cost (as may be the case for a random orientation of nanowires). FIGS. 3A-3C illustrate some exemplary configurations of nanomeshes described herein. More specifically, FIGS. 3A and 3B illustrate patterned nanomesh structures having a regular or semi-regular configuration of nanowires (107). As illustrated in FIGS. 3A and 3B, the nanowires (107) have an average diameter (Ø). Further, a patterned nanomesh structure can comprise or be defined by a plurality of nanowires (107) arranged in repeating units or geometries. For instance, in FIG. 3A, the nanowires (107) are arranged in a regular square grid. In FIG. 3B, the nanowires (107) define a repeating hexagon pattern. Moreover, the nanomeshes of FIG. 3A and FIG. 3B have regular nanowire spacings (Δ). In contrast, FIG. 3C illustrates a pseudorandom or random nanomesh structure defined by randomly or pseudo-randomly oriented nanowires (107). Again, it is to be understood that the orientation or arrangement of the nanowires in the nanomesh can be selected to achieve a desired or preselected average spacing of the nanowires and/or to provide a desired sheet resistivity, conductivity, and/or optical transparency to the electrically conductive layer, as described further hereinbelow.

An electrically conductive layer comprising or formed from a nanomesh material can have any thickness not inconsistent with the present disclosure. For example, in some implementations, an electrically conductive layer formed from a nanomesh can have an average thickness of less than or equal to about 300 nm, less than or equal to 200 nm, less than equal to 100 nm, or less than or equal to 50 nm. In some cases, an electrically conductive layer comprising a nanomesh can have an average thickness between about 10 nm and about 300 nm, between about 10 nm and about 250 nm, between about 10 nm and about 200 nm, between about 10 nm and about 150 nm, between about 10 nm and about 100 nm, or between about 10 nm and about 50 nm. In other instances, the average thickness is between about 20 nm and about 100 nm, between about 20 nm and about 80 nm, between about 20 nm and about 60 nm, or between about 20 nm and about 40 nm. As described above for electrically conductive layers more generally, the thickness of a specific nanomesh, in some cases, can be selected to provide a desired combination of or balance between the electrically conductivity and the optical transparency of the nanomesh. Similarly, a nanomesh can comprise or be formed from nanowires having an average diameter of about 300 nm or less, about 250 nm or less, about 200 nm or less, about 150 nm or less, about 100 nm or less, or about 50 nm or less. In some cases, the nanowires can have an average diameter between about 10 nm and about 50 nm, between about 10 nm and about 100 nm, between about 10 nm and about 150 nm, between about 10 nm and about 200 nm, between about 10 nm and about 150 nm, or between about 10 nm and about 300 nm. Further, the nanowires of a nanomesh described herein can have any spacing not inconsistent with the objectives of the present disclosure. For example, an average spacing between the nanowires in the nanomesh can be less than about 100 μm, such as less than about 75 μm, less than about 50 μm, or less than or equal to about 30 μm. In some instances, an average spacing between the nanowires in the nanomesh can be between about 1 μm and about 5 μm, between about 5 μm and about 10 μm, or between about 10 μm and about 30 μm. In certain other cases, an average spacing between the nanowires in the nanomesh can be between about 1 μm and about 10 μm, between about 1 μm and about 30 μm, or between about 5 μm and about 30 μm. FIG. 4 illustrates calculated theoretical optical transparency values over a range of electromagnetic wavelengths of light for electrically conductive layers comprising or formed from nanomesh layers having various nanowire diameters and/or spacings consistent with the foregoing. As described further hereinbelow, the nanowire diameters and/or spacings of a nanomesh can be selected to provide a desired optical transparency profile to the nanomesh, including in a wavelength-dependent manner.

In addition, in some implementations, a nanomesh described herein can have an optical transparency described hereinabove for an electrically conductive layer more generally. In some instances, for example, a nanomesh has an average transparency of at least 90% for wavelengths of light between 350 nm and 800 nm. Further, in some cases, a nanomesh is optically transparent to a wavelength of light (λ) in the range of $\lambda_a \leq \lambda \leq \lambda_b$, wherein $\lambda_a$ is at least about 5 times the average diameter of the nanowires (Ø), such as between about 5 Ø and about 10 Ø, and $\lambda_b$ is equal to an average spacing between the nanowires (Δ).

Moreover, as noted above, the structure of a nanomesh and/or the material used to form a nanomesh, in some implementations, can be selected to provide a desired optical transparency in a wavelength-dependent manner. For example, in some instances, the structure and/or materials of a nanomesh are selected to provide an optical transparency in a given wavelength range (such as 350-800 nm), wherein the optical transparency is "peaked" or "notched" within the wavelength range. An optical transparency profile that is "peaked," for reference purposes herein, includes a peak of increased transparency within the wavelength range, wherein the peak has a higher transparency than the transparency in the remainder of the wavelength range. For example, in some cases, an optical transparency profile ranging from 350 nm to 800 nm can have a peak in transparency in the green portion of the spectrum, such as in a window ranging from 510 to 540 nm. Thus, a nanomesh having such an optical transparency profile can be especially transparent or more transparent in the green portion of the spectrum, as compared to other portions of the spectrum between 350 nm and 800 nm. Similarly, an optical transparency profile that is "notched" can include a notch of decreased transparency within the wavelength range, wherein the notch has a lower transparency than the transparency in the remainder of the wavelength range. For instance, in one example, an optical transparency profile ranging from 350 nm to 800 nm can have a notch in transparency in the red portion of the spectrum, such as in a window ranging from 630 to 680 nm. Thus, a nanomesh having such an optical transparency profile can be less transparent in the red portion of the spectrum, as compared to other portions of the spectrum between 350 nm and 800 nm. Moreover, in some implementations described herein, the "peak" or "notch" of a "peaked" or "notched" transparency profile, respectively, can have any shape not inconsistent with the objectives of the present disclosure. In some cases, for example, a peak or notch can have a Gaussian or monomodal shape. Alternatively, in other instances, the peak or notch can have a step function or square shape. Additionally, the peak or notch of a peaked or notched transparency profile can have a transparency that differs by at least 10%, at least 20%, at least 30%, or at least 40% from the average transparency of the remainder of the wavelength range over which the nanomesh is generally transparent as described herein, where the percentage is based on the value of the average transparency of the remainder of the wavelength range. In some cases, the peak or notch can have a transparency that differs by 10-400%, 10-300%, 10-200%, 10-100%, 10-80%, 10-60%, 20-200%, 20-100%, 20-60%, 50-400%, 50-300%, 50-200%, or 50-100% from the average transparency of the remainder of the wavelength range. Further, a nanomesh having a wavelength-dependent optical transparency profile such as described herein can have one peak or notch, or more than one peak or notch. In addition, in some implementations, a nanomesh has an optical absorption profile that is wavelength-dependent in a manner such as described above for optical transparency profiles.

In some cases, a nanomesh having a predetermined wavelength-dependent optical transparency and/or optical absorption profile such as described above can be obtained by forming the nanomesh in accordance with a Mie solution to a set of Maxwell's equations for the nanomesh. For example, such a Mie solution can be obtained as follows.

First, it is to be understood that the transmission of light at wavelength λ for a nanomesh consisting of a plurality of nanoscale objects (such as nanowires described herein) having at least one geometric dimension (r or Ø) that is less than λ and having an average spacing (Δ) that is greater than λ can, in general, be determined by calculating the scattering and absorption coefficients of a single nanoscale object forming the nanomesh. Such an object, in general, may include multiple regions or boundaries with different complex dielectric coefficients (ε). The scattering and absorption coefficients for the object may be found via a steady state analysis of the electromagnetic scattering of a plane wave by the object, wherein electromagnetic fields representing a plane wave are incident on the object at some angle, penetrate the object, and are scattered into fields decaying in a manner that is inversely proportional to the distance from the object. Next, to determine the scattering and absorption coefficients, a Mie solution to a set of Maxwell's equations can be used. In particular, relative intensities of the fields are solved by satisfying the boundary conditions determined by Maxwell's equations at every surface, junction, or boundary of differing dielectric coefficient. These relative intensities then yield the scattering and absorption coefficients S and A, respectively. The optical transmission or transparency is then given by T=1−S−A.

In one representation, a nanomesh may be described as semi-infinite cylinders (where "semi-infinite" indicates a geometric dimension or length of the cylinders larger than λ, here equivalent to the spacing Δ). More particularly, the semi-infinite cylinders can be considered to have a single complex dielectric coefficient ε. Such a representation or setup can approximate multi-walled carbon nanotubes or nanowires with a width to height ratio close to 1. The Mie solution for this setup with a plane wave normally incident on the cylinder yields two scattering terms and two absorption terms, one for each orthogonal polarization of light. Thus, the transparency T can be expressed according to Equation (I):

$$T = 1 - \frac{1}{2L}(a+b+c+d), \quad (I)$$

wherein a is the cross-sectional area per unit length of parallel absorption;
wherein b is the cross-sectional area per unit length of parallel scattering;
wherein c is the cross-sectional area per unit length of perpendicular absorption; and
wherein d is the cross-sectional area per unit length of perpendicular absorption. A number of cross-sections per unit length of "parallel" and "perpendicular" absorption and/or scattering, for reference purposes herein, indicates, the equivalent thickness (which may or may not be the actual geometric thickness of the cylinder) that accounts for all the absorbtion or scattering of light which is polarized either parallel with or perpendicular to the semi-infinite axis of the nanomesh. The number of cross-sections per unit length of parallel absorption (a) can be determined according to Equation II:

$$a = 2\pi k r^2 \, \text{Im}(\varepsilon - 1) \quad (II),$$

wherein k is a wave vector of incident light, determined according to Equation VI:

$$k = \frac{2\pi}{\lambda};\qquad\text{(VI)}$$

wherein r is a radius of the nanowires;
wherein Im is a function for calculating the imaginary part of (ε−1); and
wherein ε is a complex dielectric coefficient of a material forming the nanowires. The number of cross-sections per unit length of parallel scattering (b) can be determined according to Equation III:

$$b = 2\pi k^3 r^4 \, \text{Abs}(\varepsilon-1)\qquad\text{(III);}$$

wherein k is a wave vector of incident light, determined according to Equation VI;
wherein r is a radius of the nanowires;
wherein Abs(ε−1) is the absolute value of (ε−1); and
wherein ε is a complex dielectric coefficient of a material forming the nanowires. The number of cross-sections per unit length of perpendicular absorption (c) can be determined according to Equation IV:

$$c = 2\pi k r^2 \, \text{Im}\left[\frac{(\varepsilon-1)}{(\varepsilon+1)}\right];\qquad\text{(IV)}$$

wherein k is a wave vector of incident light, determined according to Equation VI;
wherein r is a radius of the nanowires;
wherein Im is a function for calculating the imaginary part of (ε−1)/(ε+1); and
wherein ε is a complex dielectric coefficient of a material forming the nanowires. The number of cross-sections per unit length of perpendicular scattering (d) can be determined according to Equation V:

$$d = 2\pi k^3 r^4 \, \text{Abs}\left[\frac{(\varepsilon-1)}{(\varepsilon+1)}\right];\qquad\text{(V)}$$

wherein k is a wave vector of incident light, determined according to Equation VI;
wherein r is an average radius of the nanowires;
wherein Abs is the absolute value; and
wherein ε is a complex dielectric coefficient of a material forming the nanowires.

Electrically conductive layers comprising or formed from a nanomesh described herein can be formed, produced, or applied in any manner not inconsistent with the objectives of the present disclosure. For example, in some implementations, a nanomesh can be formed, produced, or applied using nanoimprint lithography or molding/stamping. In certain other implementations, as in the case of a random or pseudorandom configuration, a nanomesh can be formed using spray coating, spin coating, or another application method using a dispersion or solution of the nanowires. In such cases, the dispersion or solution can be sprayed, spun, and/or otherwise applied to a substrate and allowed to dry such that a random or pseudorandom arrangement of nanowires is formed.

Electrically conductive layers of an apparatus described herein can also comprise or be formed from materials other than a TCO or nanomesh of nanowires. For example, in some implementations, an electrically conductive layer can comprise or be formed from one or more layers of graphene. In certain other implementations, an electrically conductive layer can comprise or be formed from a conductive polymer such as a derivative of polyacetylene, polyaniline, polypyrrole, or polythiophene. For example, in some cases, an electrically conductive layer can comprise poly(3,4-ethylenedioxythiophene) and/or poly(3,4-ethylenedioxythiophene):poly(styrene sulfonate). In certain other implementations, poly(4,4-dioctylcyclopentadithiophene) doped with iodine or 2,3-dichloro-5,6-dicyano-1,4-benzoquinone can be used.

Figure 1B:
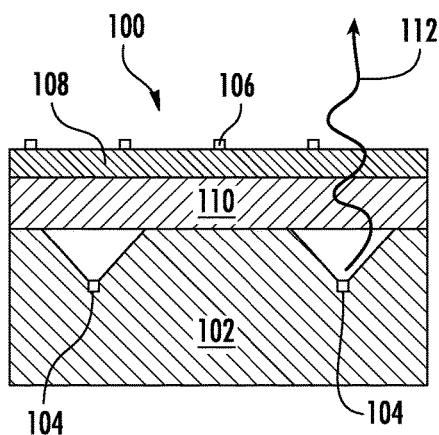
Figure 1C:
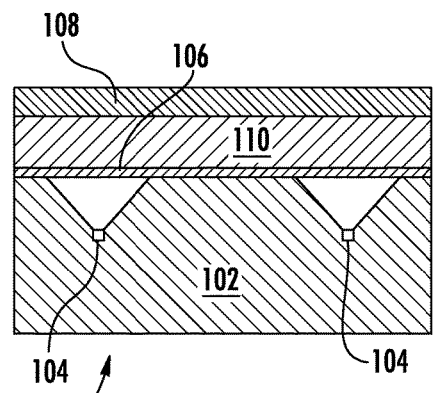
Figure 1D:
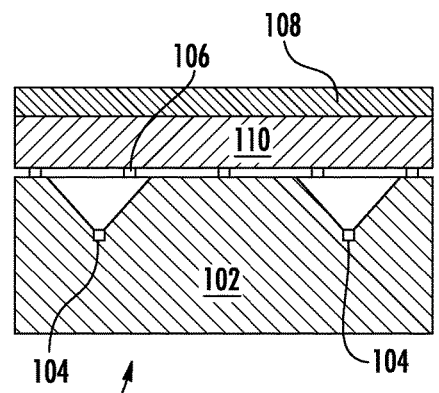
Figure 2A:
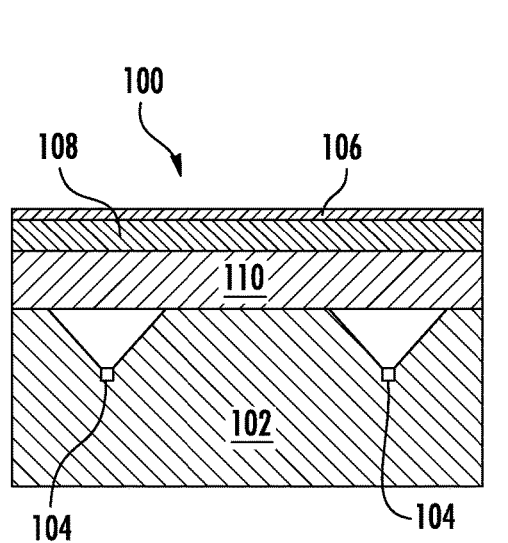
FIGS. 2A-2B each illustrates cross-sectional schematic views of apparatus according to some implementations described herein.
Figure 2B:
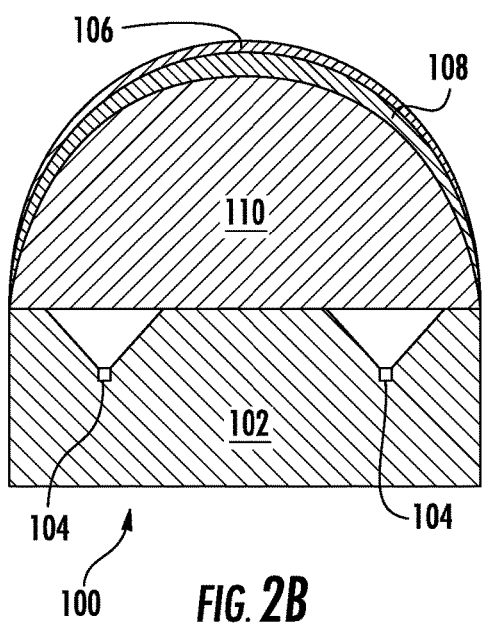

In addition, an apparatus described herein, in some implementations, further comprises an optically transparent or substantially optically transparent lens. The lens can be disposed over the light source of the apparatus and in an optical path of the light source. A lens of an apparatus described herein can have any shape or configuration and can comprise or be formed from any material not inconsistent with the objectives of the present disclosure. For example, in some cases, a lens is planar or substantially planar. In other instances, a lens is a curved lens, such as a convex, concave, hemispherical, spherical, aspheric, or cylindrical lens. Further, a lens can comprise or be formed from a glass or a polymeric material such as a polycarbonate. A lens described herein can be operable to focus or direct light emitted by the light source along an optical path or, in the case of a planar lens, may be operable to shield the light source from impact while being optically transparent so as to permit light to be emitted along the optical path. FIGS. 2A and 2B illustrate differing implementations of lighting apparatus (100) utilizing a planar lens (110, FIG. 2A) and a curved lens (110, FIG. 2B). The additional elements depicted in FIG. 2A and FIG. 2B are described further hereinbelow with reference to FIG. 1, where similar reference characters refer to similar elements.

An apparatus described herein can also comprise one or more layers or coatings operable to reduce or minimize reflection of light, including from a lens of the apparatus. Such a layer is referenced herein as an "anti-reflective coating" ("ARC"). In some implementations, the electrically conductive layer of the apparatus is operable as an ARC. The electrically conductive layer, therefore, can comprise or include materials operable to permit anti-reflective utility. In certain other implementations, an ARC is a different layer than the electrically conductive layer. Moreover, the ARC, in some cases, can form a second electrically conductive layer disposed over the light source.

In implementations wherein the ARC and the electrically conductive layer are different layers, the ARC can be disposed on the apparatus relative to the electrically conductive layer in any manner or in any configuration not inconsistent with the objectives of the present disclosure. FIGS. 1A-1D, for example, illustrate a number of configurations which can be used consistent with the present disclosure. Each of FIGS. 1A-1D illustrates an apparatus (100) comprising a portion of a housing (102), a plurality of light sources (104) disposed in the housing (102), an electrically conductive layer (106) disposed over the light sources (104) and in an optical path (112) of the light sources (104), an anti-reflective coating (108), and a lens (110). In some implementations, as in FIGS. 1A and 1B, the ARC (108) is disposed between the plurality of light sources (104) and the electrically conductive layer (106). In certain other cases, as in FIGS. 1C and 1D, the electrically conductive layer (106) is disposed between the light sources (104) and the ARC (108). Further, in some implementations, the electrically conductive layer (106) is in direct physical contact with the ARC (108), as illustrated in FIGS. 1A and 1B. In certain other implementations, the electrically conductive layer (106) is not in direct physical contact with the anti-reflective coating (108), as illustrated in FIGS. 1C and 1D. Generally, an ARC, where present, can be disposed on an outer surface of the lens (110) relative to the light sources (104). In implementations having an ARC (108) separate from the electrically conductive layer (106), the ARC (108) can, in some cases, operate as a conductor of electricity consistent with the disclosure of an electrically conductive layer described herein.

An ARC can comprise or be formed from any material not inconsistent with the objectives of the present disclosure. For example, an ARC can comprise or be formed from one or more of Al, Ag, Au, $MgF_2$, ZnS, $TiO_2$, and/or $SiO_2$. Additionally, an ARC can have a single-layer or multiple layer structure. For example, an ARC can comprise or include a plurality of layers comprising materials having differing indices of refraction.

In another aspect, protective attachments or apparatus for light sources are described herein. In some instances, such a protective attachment or apparatus can be a lens assembly or transparent cover for a light source. For example, in some instances, a protective attachment or apparatus described herein comprises an optically transparent substrate or lens and an electrically conductive layer disposed on the substrate or lens, wherein the electrically conductive layer has a structure such as described herein for a lighting apparatus and wherein the electrically conductive layer is operable to form a Faraday cage surrounding the light source when the substrate or lens and the light source are disposed in an electrically conductive housing.

In still another aspect, methods of protecting a light source from electrical damage are described herein. More particularly, a method described herein, in some cases, can protect a light source, such as an LED, from damage caused by external electric fields, electric current, electrical shocks, and/or static or non-static electrical discharge. In some implementations, such a method comprises disposing a light source in a housing and disposing an electrically conductive layer over the light source and in an optical path of the light source, wherein the electrically conductive layer has an optical transparency of at least 70% in the visible region of the electromagnetic spectrum and wherein the electrically conductive layer and the housing together form a Faraday cage surrounding the light source. In other instances, such a method comprises disposing a protective attachment or apparatus described herein over a light source, the protective attachment or apparatus comprising an attachment or apparatus described hereinabove. It is to be understood that the light source, housing, and electrically conductive layer of a method described herein can have any of the properties or features of these components described hereinabove in the context of lighting apparatus.

Various implementations of apparatus and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner and/or in any order not inconsistent with the objectives of the present disclosure, and various configurations or adaptations of apparatus described herein may be used.

That which is claimed is:

1. An apparatus comprising:
    a housing disposed in or on an exterior surface of a vehicle;
    a light emitting diode disposed in the housing;
    an anti-reflective coating disposed over the light emitting diode and in an optical path of the light emitting diode; and
    an electrically conductive layer disposed over the light emitting diode and in the optical path of the light emitting diode, wherein the electrically conductive layer comprises a nanomesh including a plurality of nanowires arranged in a regular or semi-regular configuration,
    wherein the electrically conductive layer has an optical transparency of at least 70% in a visible region of the electromagnetic spectrum; and
    wherein the electrically conductive layer and the housing together form a Faraday cage surrounding the light emitting diode.

2. The apparatus of claim 1, wherein the electrically conductive layer has an optical transparency of at least 90% in the visible region of the electromagnetic spectrum.

3. The apparatus of claim 1, wherein the electrically conductive layer has a sheet resistivity of less than or equal to 100 Ohms/square.

4. The apparatus of claim 1, wherein the electrically conductive layer is operable as an anti-reflective coating.

5. The apparatus of claim 1, wherein the anti-reflective coating forms a second electrically conductive layer.

6. The apparatus of claim 1, wherein the anti-reflective coating is disposed between the light emitting diode and the electrically conductive layer.

7. The apparatus of claim 1, wherein the electrically conductive layer is disposed between the light emitting diode and the anti-reflective coating.

8. The apparatus of claim 1, wherein the electrically conductive layer is in direct physical contact with the anti-reflective coating.

9. The apparatus of claim 1, wherein the electrically conductive layer is not in direct physical contact with the anti-reflective coating.

10. The apparatus of claim 1, wherein the electrically conductive layer comprises a transparent conductive oxide.

11. The apparatus of claim 1, wherein the plurality of nanowires comprise metal nanowires, carbon nanotubes, transparent conductive oxides, and/or combinations thereof.

12. The apparatus of claim 1, wherein each of the plurality of nanowires has a diameter of less than or equal to about 40 nm.

13. The apparatus of claim 1, wherein an average spacing between nanowires in the nanomesh is between about 1 μm and about 5 μm, between about 5 μm and about 10 μm, or between about 10 μm and about 30 μm.

14. The apparatus of claim 1, wherein the nanomesh has an average transparency of at least 90% for wavelengths of light between 350 nm and 800 nm,
    wherein a transparency (T) for a single wavelength (λ) is determined according to Equation I:

$$T = 1 - \frac{1}{2L}(a+b+c+d), \tag{I}$$

wherein a is a cross-sectional area per unit length of parallel absorption, determined according to Equation II:

$$a = 2\pi k r^2 \, Im(\varepsilon - 1) \tag{II},$$

wherein b is a cross-sectional area per unit length of parallel scattering, determined according to Equation III:

$$b = 2\pi k^3 r^4 Abs(\varepsilon - 1) \tag{III};$$

wherein c is a cross-sectional area per unit length of perpendicular absorption, determined according to Equation IV:

$$c = 2\pi k r^2 \, Im\left[\frac{(\varepsilon - 1)}{(\varepsilon + 1)}\right]; \tag{IV}$$

wherein d is a cross-sectional area per unit length of perpendicular scattering, determined according to Equation V:

$$d = 2\pi k^3 r^4 Abs\left[\frac{(\varepsilon - 1)}{(\varepsilon + 1)}\right]; \tag{V}$$

wherein k is a wave vector of incident light, determined according to Equation VI:

$$k = \frac{2\pi}{\lambda}, \tag{VI}$$

wherein r is an average radius of the nanowires;

wherein Im is a function for calculating the imaginary part of a complex number;

wherein $\varepsilon$ is a complex dielectric coefficient of a material forming the nanowires; and wherein Abs is the absolute value.

15. The apparatus of claim 1, wherein an average diameter of a nanowire of the plurality of nanowires an average spacing between the nanowires of the nanomesh, or both is selected to provide a wavelength-dependent optical transparency or absorption profile of the nanomesh.

16. The apparatus of claim 1, wherein the nanomesh has a peaked optical transparency profile.

17. The apparatus of claim 1, wherein the nanomesh has a notched optical transparency profile.

18. The apparatus of claim 1, wherein the electrically conductive layer comprises at least one layer of graphene.

* * * * *